No. 631,142. Patented Aug. 15, 1899.
D. W. WILLIAMS.
BICYCLE TIRE SHIELD.
(Application filed Dec. 2, 1898.)

(No Model.)

Witnesses;
Rena E. Randle
A. M. Gardner,

Daniel W Williams
Inventor;
By
Robert W Randle
Attorney

THE NORRIS PETERS CO., PHOTO-LITHO., WASHINGTON, D. C.

UNITED STATES PATENT OFFICE.

DANIEL W. WILLIAMS, OF RICHMOND, INDIANA.

BICYCLE TIRE-SHIELD.

SPECIFICATION forming part of Letters Patent No. 631,142, dated August 15, 1899.

Application filed December 2, 1898. Serial No. 698,052. (No model.)

*To all whom it may concern:*

Be it known that I, DANIEL W. WILLIAMS, a citizen of the United States, residing at Richmond, in the county of Wayne and State of Indiana, have invented certain new and useful Improvements in Bicycle Tire-Shields; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in bicycle tire-guards; and it consists of metal or other hard substance formed into curved sections and made to conform to the shape of the rubber tire of a vehicle; and the objects of my improvements are, first, to provide a guard that will protect rubber tires from being punctured; second, to provide a guard that will protect rubber tires from wear by incasing the tire in a flexible metal tube or casing, and, third, to provide a new article of manufacture that will be a great saving to the rubber tire of vehicles and that can be manufactured and sold at a very low price.

To this end my invention consists in the details of construction and arrangements of parts, as hereinafter more fully described and claimed, and as illustrated in the accompanying drawings, wherein—

Figure 1:
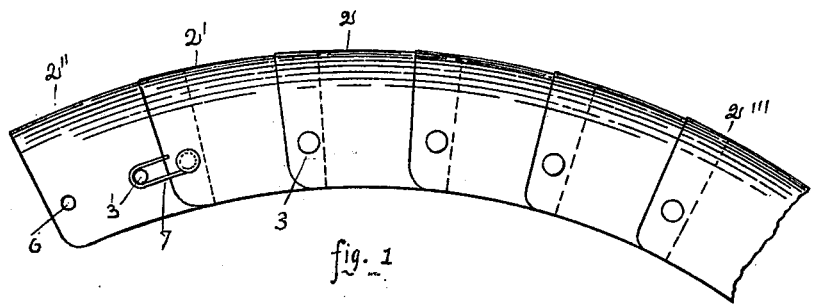
Figure 2:
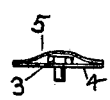
Figure 3:
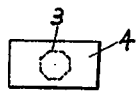

Figure 1 is a side view of a part of six sections of the guard, showing the means for connecting the ends of the guard. Fig. 2 is a sectional view of one of the rivets or screws for holding the sections together, showing a cap over the inside head of the rivet or screw to protect the tire from wear by coming in contact with the rivet or screw. Fig. 3 is a view of the under side of Fig. 2; and Fig. 4 is a view in perspective of one of the sections as shown in Fig. 1.

Similar figures refer to similar parts throughout the several views.

Figure 4:
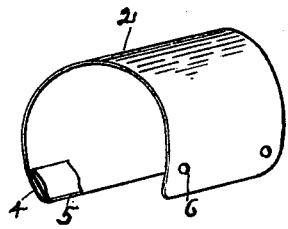

My guard is composed of a number of semicircular sections, as shown in Fig. 4, constructed of any suitable material and are riveted or bolted together, as shown in Fig. 1, sufficient in number to form a complete circle and a diameter sufficient to encircle a bicycle-tire and to completely cover the same. Each section, as shown in Fig. 4, is supplied with four holes 6, two on each side of the section and located near their ends. Beginning with section 2, Fig. 1, the next section is inserted slightly into this, so that the holes referred to of the two sections register, and a rivet or screw 3 is inserted in each side, thus binding the two sections together, as shown in Fig. 1. The next section is inserted in the section just referred to and in the same way, and so on until a complete circle is formed, or a sufficient number of sections are thus assembled or joined together to form a circle of the size desired. Each section works freely on the rivets or screws as pivots, so that the whole will form a flexible tube or casing, as described.

The end section of my improved guard is constructed in the same way as the remaining sections, except that it is provided with projecting lugs or pins 3', which may be formed integral therewith during the course of manufacture or secured thereto afterward. These lugs or pins are located on the periphery of the sections between and in line with the holes 6 6 in the ends thereof. This section is united to the remaining ones in the same manner as the others; but before the joining or connecting rivet 3 is upset the eye of a hook 7 is inserted over each next the periphery of the section, and the whole is then fastened together. The hooks have elongated bills, which form a slot in which the lugs work, for holding the guard about the tire, as will be understood.

My device is attached as follows: The air in the tire to be covered is exhausted, so that the tire is collapsed. My device as previously prepared is placed around the tire, so that the tire is entirely covered, or nearly so, by the hollow of the guard, as previously described. The ends of the device are brought together and the hooks 7 are brought over the rivet 3'. The tire is then inflated in the usual manner, which holds my device firmly to the tire.

In order to present a smooth surface to the rubber tire on the inside of the guard and to prevent the rivet-heads from puncturing the same, I provide a shield which is composed of a base 4, having a perforation therein and which stands between the heads of the rivets and the inner face of the sections, and a cap 5, which passes over and covers the heads. If desired, this shield may be formed of a single piece of metal with its ends turned back, so as to pass under the heads of the rivets. The edges are then constructed with a straight or notched surface for the reception of the body of the rivet, as desired. However, either form may be used with equal advantage and is placed in position before the rivets are upset.

Having thus described my invention, what I claim, and desire to secure by Letters Patent, is—

1. A bicycle tire-guard, composed of overlapping pivoted sections, lugs independent of the pivots projecting from the periphery of one of the end sections, and independent hooks provided with elongated bills, said hooks being pivotally secured to the other end section by means of the connecting-pivots, and adapted to engage the lugs, substantially as and for the purpose set forth.

2. A bicycle tire-guard, composed of overlapping pivoted sections, lugs independent of the pivots projecting from one of the end sections, hooks secured to the other end section, and adapted to engage the lugs, and a protecting-shield over the head of each rivet, inside the guard to protect the same from puncturing the tire, substantially as described.

3. In a bicycle tire-guard, the combination with a series of pivoted sections, lugs on one of the end sections and hooks on the other adapted to engage the lugs; of a shield, composed of a cap and a perforated base, said base being adapted to surround the body of the rivet between the head and the inner face of the end section so that the cap will cover the head of each rivet, substantially as described and for the purpose set forth.

In testimony whereof I affix my signature in presence of two witnesses.

DANIEL W. WILLIAMS.

Witnesses:
RENA E. RANDLE,
A. M. GARDNER.